April 26, 1938.   H. M. PRYALE ET AL   2,115,177
SADDLE SEAT
Filed Sept. 16, 1935
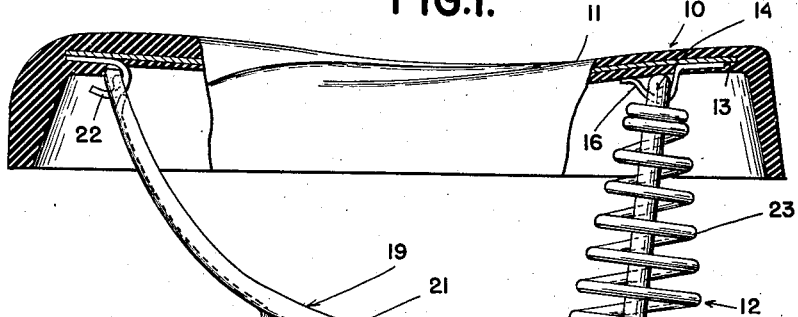
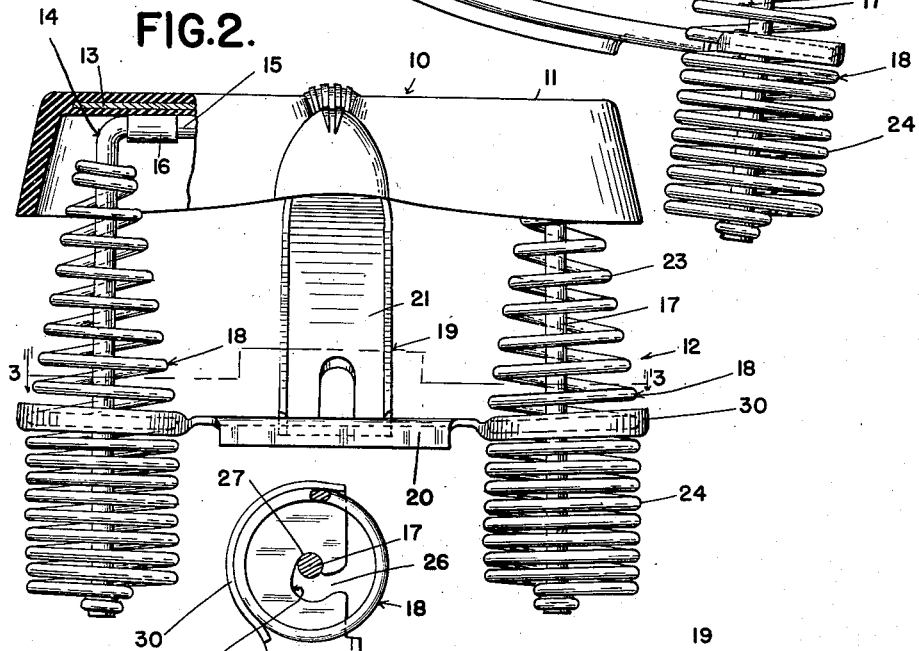
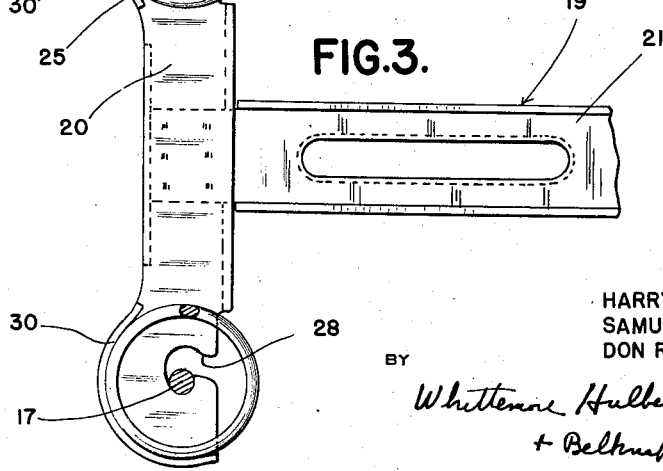
INVENTORS
HARRY M. PRYALE
SAMUEL C. CLARK
DON R. COTTERMAN
BY Whittemore Hulbert Whittemore
+ Belknap   ATTORNEYS

UNITED STATES PATENT OFFICE 2,115,177

SADDLE SEAT

Harry M. Pryale, Samuel C. Clark, and Don R. Cotterman, Pontiac, Mich.

Application September 16, 1935, Serial No. 40,816

6 Claims. (Cl. 155—5.20)

This invention relates generally to seats, and refers more particularly to saddle seats of the type employed in connection with bicycles, tricycles, motorcycles and the like.

One of the principal objects of this invention is to simplify, render more efficient, and improve generally saddles of the above character, by providing an improved spring suspension system embodying springs highly effective in not only yieldably sustaining the load on the saddle seat, but also in cushioning the reaction of the springs or rebound effect of the latter.

Another advantageous feature of this invention resides in the provision of a saddle suspension system comprising a truss having a reach portion connected to the forward end of the pommel of the saddle, and having a transverse portion at the rear end dividing the vertical suspension springs on the arms of the yoke into upper and lower sections, in such a manner that the lower sections of the springs not only operate through the yoke to effectively cushion the rebound action of the system, but also cooperate with the upper sections of the springs to yieldably sustain the weight on the saddle seat.

A further object of the present invention resides in the novel manner in which the extremities of the transverse portion of the truss are permanently secured to the arms of the yoke between the sections of the springs for vertical sliding movement on the arms of the yoke.

In addition to the foregoing, the present invention contemplates a suspension system for saddle seats capable of being inexpensively manufactured, assembled and installed. The above, as well as other objects will be made more apparent as this description proceeds, especially when considered in connection with the accompanying drawing, wherein:

Figure 1 is a side elevational view, with certain parts broken away, of a saddle equipped with a suspension system constructed in accordance with this invention;

Figure 2 is a rear elevational view, with certain parts broken away, of the construction shown in Figure 1;

Figure 3 is a sectional view taken substantially on the line 3—3 of Figure 2.

Referring now more in detail to the several figures of the drawing, it will be noted that the reference character 10 designates a saddle assembly comprising a seat 11 and a suspension system 12. The seat 11 may be of any desired construction, but in the present instance, is shown as molded from rubber or from a material containing rubber, and is provided with a metal insert in the form of a plate 13 having lugs struck out therefrom for the purpose of securing the spring suspension system 12 to the seat.

The suspension system 12 is provided with a yoke 14 of inverted U-shaped configuration having a base portion 15 secured to the underside of the saddle seat adjacent the rear end thereof by the tongues 16 struck out from the metal insert or plate 13 and bent alternately in opposite directions around the base portion 15 of the yoke. The arms 17 of the yoke extend downwardly in a vertical direction from opposite ends of the yoke through the suspension springs 18, and the lower ends of the arms are grooved to provide for rotatably securing the suspension springs thereto.

The forward portion of the saddle seat is supported by means of a truss 19 also operable to hold the arms of the yoke and associated suspension springs in substantially vertical position with respect to the seat. As shown particularly in Figure 3, the truss 19 is substantially T-shaped in elevation having a transverse portion 20 at the rear end for attachment to the arms of the yoke, and having a forwardly extending reach portion 21 hingedly connected to the pommel of the saddle by a tongue 22 struck out from the plate 13 and bent through an aperture provided in the forward end of the reach.

The extremities of the transverse portion 20 of the truss extend between adjacent convolutions of the suspension springs in such a manner as to divide the latter into upper and lower sections 23 and 24 respectively. Although the sections are integral, nevertheless, the upper sections 23 are in the form of conical compression members having the convolutions thereof spaced from each other a greater distance than the convolutions of the lower sections 24. On the other hand, the convolutions of the lower sections 24 of the suspension springs are preferably cylindrical, and these sections may be considered tension members.

Due to the fact that the extremities of the transverse portion 20 of the truss are interposed between the aforesaid sections of the suspension springs in the manner shown in Figure 2, both of the sections of the springs will cooperate with one another to yieldably sustain the load on the saddle seat, and the lower sections 24 will serve to dampen the reaction or rebound of the springs.

As previously stated, one of the objects of the invention resides in the novel means in which the truss is slidably secured to the arms 17 of the yoke 14 between the aforesaid convolutions of the suspension springs. In detail, the extremities of the transverse portion of the yoke extending between the convolutions of the suspension springs are formed with substantially L-shaped slots 25 therein having the leg portions 26 thereof extending rearwardly from the forward edge of the transverse portion 20 of the truss to the angular leg portions 27 thereof and are inclined inwardly toward the median center line of the saddle unit to provide a cam face 28. The angular leg portions 27 extend outwardly from the rear ends of the portions 26 and are of sufficient width to receive the arms 17 of the yoke. The locations of the slots 25 are predetermined so that in the assembled relation of the truss the arms are held in the portions 27 of the slot under a tension sufficient to hold the parts in assembled relationship, but at the same time permitting relatively free sliding movement of the rear end of the truss axially of the arms. In addition, the cam surfaces 28 of the slots are so located as to cam the arms 17 of the yoke into engagement with the portions 27 of the slots upon assembling the truss with the arms by displacement of the truss forwardly relative to the arms. In other words, when it is desired to assemble the truss with the yoke, the extremities of the transverse portion 20 are inserted between the desired convolutions of the suspension springs with the arms of the yoke in registration with the forward ends of the portions 28 of the slots. As movement of the yoke in a forward direction relative to the arms 17 of the yoke is continued, the cam surfaces 28 of the slots tension the arms 17 of the yoke by urging the same inwardly until they approach the leg portions 27 of the slots, and since the latter leg portions extend outwardly from the leg portions 26, it necessarily follows that the arms 17 will snap into engagement with the leg portions 27 of the slots as the same approach their normal position. Attention may also be called to the fact that the extremities of the transverse portion 20 of the truss 19 are provided with upstanding flanges 30 concentrically arranged with respect to the lowermost convolutions of the upper sections 23 of the suspension springs and engageable with these convolutions throughout a substantial portion of their length to positively hold the suspension springs against lateral displacement. From the above, it will be seen that the connection of the truss with the arms also permits the springs to rotate relative to the truss and arms. This is desirable in that it permits adjusting the springs to locate a selected number of the convolutions above and below the truss.

Thus from the foregoing, it will be observed that we have provided a saddle seat suspension system embodying a relatively few number of simple parts capable of being expediently manufactured and assembled. It will, also, be observed that although springs of one-piece construction are employed in the suspension system, nevertheless, the arrangement is such as to not only effectively yieldably sustain the weight on the saddle seat, but to also dampen the reactions or rebound of the springs. In addition, it will be apparent that the action referred to in the preceding sentence is accomplished through the medium of a relatively simple truss capable of being readily inserted between the desired convolutions of the suspension springs, and also capable of being expediently secured in the assembly without the use of fastener elements.

What we claim as our invention is:

1. A saddle unit having a seat and a spring suspension system supporting the seat comprising, rods depending from the rear end portion of the seat, a spring surrounding each of the rods and fixed to the latter at the lower ends thereof, a member extending transversely of the springs having portions located between adjacent convolutions of the springs dividing each of the latter into two sections and having a snap-on connection with the rods permitting sliding movement of said portions in opposite directions axially of the rods against the action of the spring sections, and means connecting the member to the forward end of the seat.

2. A saddle unit having a seat and a spring suspension system supporting the seat comprising, rods depending from the rear end portion of the seat, a spring surrounding each of the rods and fixed to the latter at the lower ends thereof, a member extending transversely of the springs having portions located between adjacent convolutions of the springs dividing each of the latter into two sections, each of the aforesaid portions of said member provided with an angular slot of sufficient width to receive one of the rods, one of the leg portions of the slot being arranged to spring the rod from its normal position during the passage of the same therethrough and the other of the legs extending in a direction to receive the rod as the latter tends to assume its normal position, and means connecting the member to the forward end portion of the seat.

3. A saddle unit having a seat and a spring suspension system supporting the seat comprising, rods depending from the rear end portion of the seat, a spring surrounding each of the rods and fixed to the latter at the lower ends thereof for rotation relative thereto, a member extending transversely of the springs having portions located between adjacent convolutions of the springs dividing each of the latter into two sections and having a snap-on connection with the rods permitting sliding movement of the aforesaid portions in opposite directions axially of the rods and also permitting rotation of the springs to locate a selected number of the convolutions thereof above and below said member.

4. A saddle unit having a seat and a spring suspension system supporting the seat comprising, rods depending from the rear end portion of the seat, a spring surrounding each of the rods and fixed to the latter at the lower ends thereof, a member extending transversely of the springs having portions located between adjacent convolutions of the springs to divide each of the latter into two sections, each of the aforesaid portions provided with an angular slot of sufficient width to receive the rods, one leg of the slots extending in a direction to tension the rods as the latter pass therethrough and the other legs of the slots extending at an angle to the legs aforesaid in a direction to receive the rods when the latter tend to assume their normal positions.

5. A saddle unit having a seat and a spring suspension system supporting the seat comprising, rods depending from the rear end portion of the seat, a spring surrounding each of the rods and fixed to the latter at the lower ends thereof, a member extending transversely of the springs having portions located between adjacent convolutions of the springs to divide each of the latter into two sections and having a connection with the rods permitting sliding movement thereof in opposite directions axially of the rods, said connections comprising an angular slot in each of the aforesaid portions of the member of sufficient width to receive the rods, one leg portion of the slots extending in a direction to tension the rods as the latter pass through the same and the other leg portions extending at an angle to the leg portions aforesaid in a direction to receive the rods when the latter tend to assume their normal positions, and means on said member engageable with convolutions of the springs to prevent lateral shifting movement of the springs relative to the member.

6. A saddle seat unit having a seat and a spring suspension system supporting the seat comprising, rods depending from the rear end portion of the seat, a spring surrounding each of the rods and fixed to the latter at the upper ends thereof, a member extending transversely of the springs and having opposite end portions insertable between adjacent convolutions of the springs intermediate the ends of the latter, said end portions also having provision for snap-on engagement with the rods extending axially through said springs.

HARRY M. PRYALE.
SAMUEL C. CLARK.
DON R. COTTERMAN.